(12) United States Patent
Sealey, II et al.

(10) Patent No.: US 10,954,635 B2
(45) Date of Patent: *Mar. 23, 2021

(54) DISPOSABLE TOWEL PRODUCED WITH LARGE VOLUME SURFACE DEPRESSIONS

(71) Applicant: First Quality Tissue, LLC, Great Neck, NY (US)

(72) Inventors: James E. Sealey, II, Belton, SC (US); Byrd Tyler Miller, IV, Easley, SC (US); Jeffrey Grunwald, Port Matilda, PA (US); Ashley Harris, Inman, SC (US); Justin S. Pence, Anderson, SC (US)

(73) Assignee: First Quality Tissue, LLC, Great Neck, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/716,920

(22) Filed: Dec. 17, 2019

(65) Prior Publication Data

US 2020/0123711 A1 Apr. 23, 2020

Related U.S. Application Data

(63) Continuation of application No. 15/292,991, filed on Oct. 13, 2016, now Pat. No. 10,544,547.
(Continued)

(51) Int. Cl.
*B32B 7/12* (2006.01)
*D21H 27/40* (2006.01)
(Continued)

(52) U.S. Cl.
CPC ............ *D21H 27/40* (2013.01); *B32B 7/12* (2013.01); *B32B 29/005* (2013.01); *D21H 27/002* (2013.01); *D21H 27/32* (2013.01)

(58) Field of Classification Search
CPC .......... B32B 2250/26; B32B 2262/067; B32B 29/005; B32B 3/26; B32B 3/30;
(Continued)

(56) References Cited

U.S. PATENT DOCUMENTS

| 2,919,467 A | 1/1960 | Mercer |
| 2,926,154 A | 2/1960 | Keim |

(Continued)

FOREIGN PATENT DOCUMENTS

| CA | 2168894 A1 | 8/1997 |
| CA | 2795139 A1 | 10/2011 |

(Continued)

OTHER PUBLICATIONS

International Search Report for PCT/US17/17705 dated Jun. 9, 2017.
(Continued)

*Primary Examiner* — Lawrence D Ferguson
(74) *Attorney, Agent, or Firm* — Amster, Rothstein & Ebenstein LLP

(57) ABSTRACT

A disposable tissue or paper towel product including at least two plies, an exposed outer surface of at least one of the two plies comprising a plurality of pockets, the plurality of pockets having an average volume greater than 0.4 mm³ and an average surface area of 2.5 mm².

27 Claims, 4 Drawing Sheets

Related U.S. Application Data

(60) Provisional application No. 62/240,880, filed on Oct. 13, 2015.

(51) Int. Cl.
  *B32B 29/00* (2006.01)
  *D21H 27/00* (2006.01)
  *D21H 27/32* (2006.01)

(58) Field of Classification Search
  CPC .......... B32B 7/02; B32B 7/12; D21H 27/002; D21H 27/32; D21H 27/40
  See application file for complete search history.

(56) References Cited

U.S. PATENT DOCUMENTS

| | | | |
|---|---|---|---|
| 3,026,231 | A | 3/1962 | Chavannes |
| 3,049,469 | A | 8/1962 | Davison |
| 3,058,873 | A | 10/1962 | Keim et al. |
| 3,066,066 | A | 11/1962 | Keim et al. |
| 3,097,994 | A | 7/1963 | Dickens et al. |
| 3,125,552 | A | 3/1964 | Loshaek et al. |
| 3,143,150 | A | 8/1964 | Buchanan |
| 3,186,900 | A | 6/1965 | De Young |
| 3,197,427 | A | 7/1965 | Schmatz |
| 3,224,986 | A | 12/1965 | Butler et al. |
| 3,224,990 | A | 12/1965 | Babcock |
| 3,227,615 | A | 1/1966 | Korden |
| 3,227,671 | A | 1/1966 | Keim |
| 3,239,491 | A | 3/1966 | Tsou et al. |
| 3,240,664 | A | 3/1966 | Earle, Jr. |
| 3,240,761 | A | 3/1966 | Keim et al. |
| 3,248,280 | A | 4/1966 | Hyland, Jr. |
| 3,250,664 | A | 5/1966 | Conte et al. |
| 3,252,181 | A | 5/1966 | Hureau |
| 3,301,746 | A | 1/1967 | Sanford et al. |
| 3,311,594 | A | 3/1967 | Earle, Jr. |
| 3,329,657 | A | 7/1967 | Strazdins et al. |
| 3,332,834 | A | 7/1967 | Reynolds, Jr. |
| 3,332,901 | A | 7/1967 | Keim |
| 3,352,833 | A | 11/1967 | Earle, Jr. |
| 3,384,692 | A | 5/1968 | Galt et al. |
| 3,414,459 | A | 12/1968 | Wells |
| 3,442,754 | A | 5/1969 | Espy |
| 3,459,697 | A | 8/1969 | Goldberg et al. |
| 3,473,576 | A | 10/1969 | Amneus |
| 3,483,077 | A | 12/1969 | Aldrich |
| 3,545,165 | A | 12/1970 | Greenwell |
| 3,556,932 | A | 1/1971 | Coscia et al. |
| 3,573,164 | A | 3/1971 | Friedberg et al. |
| 3,609,126 | A | 9/1971 | Asao et al. |
| 3,666,609 | A | 5/1972 | Kalwaites et al. |
| 3,672,949 | A | 6/1972 | Brown |
| 3,672,950 | A | 6/1972 | Murphy et al. |
| 3,773,290 | A | 11/1973 | Mowery |
| 3,778,339 | A | 12/1973 | Williams et al. |
| 3,813,362 | A | 5/1974 | Coscia et al. |
| 3,855,158 | A | 12/1974 | Petrovich et al. |
| 3,877,510 | A | 4/1975 | Tegtmeier et al. |
| 3,905,863 | A | 9/1975 | Ayers |
| 3,911,173 | A | 10/1975 | Sprague, Jr. |
| 3,974,025 | A | 8/1976 | Ayers |
| 3,994,771 | A | 11/1976 | Morgan, Jr. et al. |
| 3,998,690 | A | 12/1976 | Lyness et al. |
| 4,038,008 | A | 7/1977 | Larsen |
| 4,075,382 | A | 2/1978 | Chapman et al. |
| 4,088,528 | A | 5/1978 | Berger et al. |
| 4,098,632 | A | 7/1978 | Sprague, Jr. |
| 4,102,737 | A | 7/1978 | Morton |
| 4,129,528 | A | 12/1978 | Petrovich et al. |
| 4,147,586 | A | 4/1979 | Petrovich et al. |
| 4,184,519 | A | 1/1980 | McDonald et al. |
| 4,190,692 | A | 2/1980 | Larsen |
| 4,191,609 | A | 3/1980 | Trokhan |
| 4,252,761 | A | 2/1981 | Schoggen et al. |
| 4,320,162 | A | 3/1982 | Schulz |
| 4,331,510 | A | 5/1982 | Wells |
| 4,382,987 | A | 5/1983 | Smart |
| 4,440,597 | A | 4/1984 | Wells et al. |
| 4,501,862 | A | 2/1985 | Keim |
| 4,507,351 | A | 3/1985 | Johnson et al. |
| 4,514,345 | A | 4/1985 | Johnson et al. |
| 4,515,657 | A | 5/1985 | Maslanka |
| 4,528,239 | A | 7/1985 | Trokhan |
| 4,529,480 | A | 7/1985 | Trokhan |
| 4,537,657 | A | 8/1985 | Keim |
| 4,545,857 | A | 10/1985 | Wells |
| 4,637,859 | A | 1/1987 | Trokhan |
| 4,678,590 | A | 7/1987 | Nakamura et al. |
| 4,714,736 | A | 12/1987 | Juhl et al. |
| 4,770,920 | A | 9/1988 | Larsonneur |
| 4,780,357 | A | 10/1988 | Akao |
| 4,808,467 | A | 2/1989 | Suskind et al. |
| 4,836,894 | A | 6/1989 | Chance et al. |
| 4,849,054 | A | 7/1989 | Klowak |
| 4,885,202 | A | 12/1989 | Lloyd et al. |
| 4,891,249 | A | 1/1990 | McIntyre |
| 4,909,284 | A | 3/1990 | Kositake |
| 4,949,668 | A | 8/1990 | Heindel et al. |
| 4,949,688 | A | 8/1990 | Bayless |
| 4,983,256 | A | 1/1991 | Combette et al. |
| 4,996,091 | A | 2/1991 | McIntyre |
| 5,059,282 | A | 10/1991 | Ampulski et al. |
| 5,143,776 | A | 9/1992 | Givens |
| 5,149,401 | A | 9/1992 | Langevin et al. |
| 5,152,874 | A | 10/1992 | Keller |
| 5,211,813 | A | 5/1993 | Sawley et al. |
| 5,239,047 | A | 8/1993 | Devore et al. |
| 5,279,098 | A | 1/1994 | Fukuda |
| 5,281,306 | A | 1/1994 | Kakiuchi et al. |
| 5,334,289 | A | 8/1994 | Trokhan et al. |
| 5,347,795 | A | 9/1994 | Fukuda |
| 5,397,435 | A | 3/1995 | Ostendorf et al. |
| 5,399,412 | A | 3/1995 | Sudall et al. |
| 5,405,501 | A | 4/1995 | Phan et al. |
| 5,409,572 | A | 4/1995 | Kershaw et al. |
| 5,429,686 | A | 7/1995 | Chiu et al. |
| 5,439,559 | A | 8/1995 | Crouse |
| 5,447,012 | A | 9/1995 | Kovacs et al. |
| 5,470,436 | A | 11/1995 | Wagle et al. |
| 5,487,313 | A | 1/1996 | Johnson |
| 5,509,913 | A | 4/1996 | Yeo |
| 5,510,002 | A | 4/1996 | Herman et al. |
| 5,529,665 | A | 6/1996 | Kaun |
| 5,581,906 | A | 12/1996 | Ensign et al. |
| 5,591,147 | A | 1/1997 | Couture-Dorschner et al. |
| 5,607,551 | A | 3/1997 | Farrington, Jr. et al. |
| 5,611,890 | A | 3/1997 | Vinson et al. |
| 5,628,876 | A | 5/1997 | Ayers et al. |
| 5,635,028 | A | 6/1997 | Vinson et al. |
| 5,649,916 | A | 7/1997 | DiPalma et al. |
| 5,671,897 | A | 9/1997 | Ogg et al. |
| 5,672,248 | A | 9/1997 | Wendt et al. |
| 5,679,222 | A | 10/1997 | Rasch et al. |
| 5,685,428 | A | 11/1997 | Herbers et al. |
| 5,728,268 | A | 3/1998 | Weisman et al. |
| 5,746,887 | A | 5/1998 | Wendt et al. |
| 5,753,067 | A | 5/1998 | Fukuda et al. |
| 5,772,845 | A | 6/1998 | Farrington, Jr. et al. |
| 5,806,569 | A | 9/1998 | Gulya et al. |
| 5,827,384 | A | 10/1998 | Canfield et al. |
| 5,832,962 | A | 11/1998 | Kaufman et al. |
| 5,846,380 | A | 12/1998 | Van Phan et al. |
| 5,855,738 | A | 1/1999 | Weisman et al. |
| 5,858,554 | A | 1/1999 | Neal et al. |
| 5,865,396 | A | 2/1999 | Ogg et al. |
| 5,865,950 | A | 2/1999 | Vinson et al. |
| 5,893,965 | A | 4/1999 | Trokhan et al. |
| 5,913,765 | A | 6/1999 | Burgess et al. |
| 5,942,085 | A | 8/1999 | Neal et al. |
| 5,944,954 | A | 8/1999 | Vinson et al. |
| 5,948,210 | A | 9/1999 | Huston |
| 5,980,691 | A | 11/1999 | Weisman et al. |
| 6,036,139 | A | 3/2000 | Ogg |

(56) References Cited

U.S. PATENT DOCUMENTS

| | | |
|---|---|---|
| 6,039,838 A | 3/2000 | Kaufman et al. |
| 6,048,938 A | 4/2000 | Neal et al. |
| 6,060,149 A | 5/2000 | Nissing et al. |
| 6,106,670 A | 8/2000 | Weisman et al. |
| 6,149,769 A | 11/2000 | Mohammadi et al. |
| 6,162,327 A | 12/2000 | Batra et al. |
| 6,162,329 A | 12/2000 | Vinson et al. |
| 6,187,138 B1 | 2/2001 | Neal et al. |
| 6,200,419 B1 | 3/2001 | Phan |
| 6,203,667 B1 | 3/2001 | Huhtelin |
| 6,207,734 B1 | 3/2001 | Vinson et al. |
| 6,231,723 B1 | 5/2001 | Kanitz et al. |
| 6,287,426 B1 | 9/2001 | Edwards et al. |
| 6,303,233 B1 | 10/2001 | Amon et al. |
| 6,319,362 B1 | 11/2001 | Huhtelin et al. |
| 6,344,111 B1 | 2/2002 | Wilhelm |
| 6,420,013 B1 | 7/2002 | Vinson et al. |
| 6,420,100 B1 | 7/2002 | Trokhan et al. |
| 6,423,184 B2 | 7/2002 | Vahatalo et al. |
| 6,458,246 B1 | 10/2002 | Kanitz et al. |
| 6,464,831 B1 | 10/2002 | Trokhan et al. |
| 6,473,670 B1 | 10/2002 | Huhtelin |
| 6,521,089 B1 | 2/2003 | Griech et al. |
| 6,537,407 B1 | 3/2003 | Law et al. |
| 6,547,928 B2 | 4/2003 | Barnholtz et al. |
| 6,551,453 B2 | 4/2003 | Weisman et al. |
| 6,551,691 B1 | 4/2003 | Hoeft et al. |
| 6,572,722 B1 | 6/2003 | Pratt |
| 6,579,416 B1 | 6/2003 | Vinson et al. |
| 6,602,454 B2 | 8/2003 | McGuire et al. |
| 6,607,637 B1 | 8/2003 | Vinson et al. |
| 6,610,173 B1 | 8/2003 | Lindsay et al. |
| 6,613,194 B2 | 9/2003 | Kanitz et al. |
| 6,660,362 B1 | 9/2003 | Lindsay et al. |
| 6,673,202 B2 | 1/2004 | Burazin |
| 6,701,637 B2 | 5/2004 | Lindsay et al. |
| 6,755,939 B2 | 6/2004 | Vinson et al. |
| 6,773,647 B2 | 8/2004 | McGuire et al. |
| 6,797,117 B1 | 9/2004 | McKay et al. |
| 6,808,599 B2 | 10/2004 | Burazin |
| 6,821,386 B2 | 11/2004 | Weisman et al. |
| 6,821,391 B2 | 11/2004 | Scherb et al. |
| 6,827,818 B2 | 12/2004 | Farrington, Jr. et al. |
| 6,863,777 B2 | 3/2005 | Kanitz et al. |
| 6,896,767 B2 | 5/2005 | Wilhelm |
| 6,939,443 B2 | 9/2005 | Ryan et al. |
| 6,998,017 B2 | 2/2006 | Lindsay et al. |
| 6,998,024 B2 | 2/2006 | Burazin |
| 7,005,043 B2 | 2/2006 | Toney et al. |
| 7,014,735 B2 | 3/2006 | Kramer et al. |
| 7,105,465 B2 | 9/2006 | Patel et al. |
| 7,155,876 B2 | 1/2007 | VanderTuin et al. |
| 7,157,389 B2 | 1/2007 | Branham et al. |
| 7,182,837 B2 | 2/2007 | Chen et al. |
| 7,194,788 B2 | 3/2007 | Clark et al. |
| 7,235,156 B2 | 6/2007 | Baggot |
| 7,269,929 B2 | 9/2007 | VanderTuin et al. |
| 7,294,230 B2 | 11/2007 | Flugge-Berendes et al. |
| 7,311,853 B2 | 12/2007 | Vinson et al. |
| 7,328,550 B2 | 2/2008 | Floding et al. |
| 7,339,378 B2 | 3/2008 | Han et al. |
| 7,351,307 B2 | 4/2008 | Scherb et al. |
| 7,387,706 B2 | 6/2008 | Herman et al. |
| 7,399,378 B2 | 7/2008 | Edwards et al. |
| 7,419,569 B2 | 9/2008 | Hermans |
| 7,427,434 B2 | 9/2008 | Busam |
| 7,431,801 B2 | 10/2008 | Conn et al. |
| 7,432,309 B2 | 10/2008 | Vinson |
| 7,442,278 B2 | 10/2008 | Murray et al. |
| 7,452,447 B2 | 11/2008 | Duan et al. |
| 7,476,293 B2 | 1/2009 | Herman et al. |
| 7,494,563 B2 | 2/2009 | Edwards et al. |
| 7,510,631 B2 | 3/2009 | Scherb et al. |
| 7,513,975 B2 | 4/2009 | Burma |
| 7,563,344 B2 | 7/2009 | Beuther |
| 7,582,187 B2 | 9/2009 | Scherb et al. |
| 7,611,607 B2 | 11/2009 | Mullally et al. |
| 7,622,020 B2 | 11/2009 | Awofeso |
| 7,662,462 B2 | 2/2010 | Noda |
| 7,670,678 B2 | 3/2010 | Phan |
| 7,683,126 B2 | 3/2010 | Neal et al. |
| 7,686,923 B2 | 3/2010 | Scherb et al. |
| 7,687,140 B2 | 3/2010 | Manifold et al. |
| 7,691,230 B2 | 4/2010 | Scherb et al. |
| 7,744,722 B1 | 6/2010 | Tucker et al. |
| 7,744,726 B2 | 6/2010 | Scherb et al. |
| 7,799,382 B2 | 9/2010 | Payne et al. |
| 7,811,418 B2 | 10/2010 | Klerelid et al. |
| 7,815,978 B2 | 10/2010 | Davenport et al. |
| 7,823,366 B2 | 11/2010 | Schoeneck |
| 7,842,163 B2 | 11/2010 | Nickel et al. |
| 7,867,361 B2 | 1/2011 | Salaam et al. |
| 7,871,692 B2 | 1/2011 | Morin et al. |
| 7,887,673 B2 | 2/2011 | Andersson et al. |
| 7,905,989 B2 | 3/2011 | Scherb et al. |
| 7,914,866 B2 | 3/2011 | Shannon et al. |
| 7,931,781 B2 | 4/2011 | Scherb et al. |
| 7,951,269 B2 | 5/2011 | Herman et al. |
| 7,955,549 B2 | 6/2011 | Noda |
| 7,959,764 B2 | 6/2011 | Ringer et al. |
| 7,972,475 B2 | 7/2011 | Chan et al. |
| 7,989,058 B2 | 8/2011 | Manifold et al. |
| 8,034,463 B2 | 10/2011 | Leimbach et al. |
| 8,051,629 B2 | 11/2011 | Pazdernik et al. |
| 8,075,739 B2 | 12/2011 | Scherb et al. |
| 8,092,652 B2 | 1/2012 | Scherb et al. |
| 8,118,979 B2 | 2/2012 | Herman et al. |
| 8,147,649 B1 | 4/2012 | Tucker et al. |
| 8,152,959 B2 | 4/2012 | Elony et al. |
| 8,196,314 B2 | 6/2012 | Munch |
| 8,216,427 B2 | 7/2012 | Klerelid et al. |
| 8,236,135 B2 | 8/2012 | Prodoehl et al. |
| 8,303,773 B2 | 11/2012 | Scherb et al. |
| 8,382,956 B2 | 2/2013 | Boechat et al. |
| 8,402,673 B2 | 3/2013 | Dasilva et al. |
| 8,409,404 B2 | 4/2013 | Harper et al. |
| 8,435,384 B2 | 5/2013 | Dasilva et al. |
| 8,440,055 B2 | 5/2013 | Scherb et al. |
| 8,445,032 B2 | 5/2013 | Topolkaraev et al. |
| 8,454,800 B2 | 6/2013 | Mourad et al. |
| 8,470,133 B2 | 6/2013 | Cunnane et al. |
| 8,506,756 B2 | 8/2013 | Denis et al. |
| 8,544,184 B2 | 10/2013 | Dasilva et al. |
| 8,574,211 B2 | 11/2013 | Morita |
| 8,580,083 B2 | 11/2013 | Boechat et al. |
| 8,728,277 B2 | 5/2014 | Boechat et al. |
| 8,758,569 B2 | 6/2014 | Aberg et al. |
| 8,771,466 B2 | 7/2014 | Denis et al. |
| 8,801,903 B2 | 8/2014 | Mourad et al. |
| 8,815,057 B2 | 8/2014 | Eberhardt et al. |
| 8,822,009 B2 | 9/2014 | Riviere et al. |
| 8,968,517 B2 | 3/2015 | Ramaratnam et al. |
| 8,969,517 B2 | 3/2015 | Ramaratnam et al. |
| 8,980,062 B2 | 3/2015 | Karlsson et al. |
| 9,005,710 B2 | 4/2015 | Jones et al. |
| D734,617 S | 7/2015 | Seitzinger et al. |
| 9,095,477 B2 | 8/2015 | Yamaguchi |
| D738,633 S | 9/2015 | Seitzinger et al. |
| 9,382,666 B2 | 7/2016 | Ramaratnam et al. |
| 9,506,203 B2 | 11/2016 | Ramaratnam et al. |
| 9,580,872 B2 | 2/2017 | Ramaratnam et al. |
| 9,702,089 B2 | 7/2017 | Ramaratnam et al. |
| 9,702,090 B2 | 7/2017 | Ramaratnam et al. |
| 9,719,213 B2 | 8/2017 | Miller, IV et al. |
| 9,725,853 B2 | 8/2017 | Ramaratnam et al. |
| 2001/0018068 A1 | 8/2001 | Lorenzi et al. |
| 2002/0028230 A1 | 3/2002 | Eichhorn et al. |
| 2002/0060049 A1 | 5/2002 | Kanitz et al. |
| 2002/0061386 A1 | 5/2002 | Carson et al. |
| 2002/0098317 A1 | 7/2002 | Jaschinski et al. |
| 2002/0110655 A1 | 8/2002 | Seth |
| 2002/0115194 A1 | 8/2002 | Lange et al. |
| 2002/0125606 A1 | 9/2002 | McGuire et al. |
| 2003/0015248 A1 | 1/2003 | Itoh |

(56) References Cited

U.S. PATENT DOCUMENTS

| | | |
|---|---|---|
| 2003/0024674 A1 | 2/2003 | Kanitz et al. |
| 2003/0056911 A1 | 3/2003 | Hermans et al. |
| 2003/0056917 A1 | 3/2003 | Jimenez |
| 2003/0070781 A1 | 4/2003 | Hermans et al. |
| 2003/0114071 A1 | 6/2003 | Everhart et al. |
| 2003/0159401 A1 | 8/2003 | Sorenson et al. |
| 2003/0188843 A1 | 10/2003 | Kanitz et al. |
| 2003/0218274 A1 | 11/2003 | Boutilier et al. |
| 2004/0118531 A1 | 6/2004 | Shannon et al. |
| 2004/0123963 A1 | 7/2004 | Chen et al. |
| 2004/0126601 A1 | 7/2004 | Kramer et al. |
| 2004/0126710 A1 | 7/2004 | Hill et al. |
| 2004/0168784 A1 | 9/2004 | Duan et al. |
| 2004/0173333 A1 | 9/2004 | Hermans et al. |
| 2004/0234804 A1 | 11/2004 | Liu et al. |
| 2005/0016704 A1 | 1/2005 | Huhtelin |
| 2005/0069679 A1 | 3/2005 | Stelljes et al. |
| 2005/0069680 A1 | 3/2005 | Stelljes et al. |
| 2005/0098281 A1 | 5/2005 | Schulz et al. |
| 2005/0112115 A1 | 5/2005 | Khan |
| 2005/0123726 A1 | 6/2005 | Broering et al. |
| 2005/0130536 A1 | 6/2005 | Siebers et al. |
| 2005/0136222 A1 | 6/2005 | Hada et al. |
| 2005/0148257 A1 | 7/2005 | Hermans et al. |
| 2005/0150626 A1 | 7/2005 | Kanitz et al. |
| 2005/0166551 A1 | 8/2005 | Keane et al. |
| 2005/0241786 A1 | 11/2005 | Edwards et al. |
| 2005/0241788 A1 | 11/2005 | Baggot et al. |
| 2005/0252626 A1 | 11/2005 | Chen et al. |
| 2005/0280184 A1 | 12/2005 | Sayers et al. |
| 2005/0287340 A1 | 12/2005 | Morelli et al. |
| 2006/0005916 A1 | 1/2006 | Stelljes et al. |
| 2006/0013998 A1 | 1/2006 | Stelljes, et al. |
| 2006/0019567 A1 | 1/2006 | Sayers |
| 2006/0083899 A1 | 4/2006 | Burazin et al. |
| 2006/0093788 A1 | 5/2006 | Behm et al. |
| 2006/0113049 A1 | 6/2006 | Knobloch et al. |
| 2006/0130986 A1 | 6/2006 | Flugge-Berendes et al. |
| 2006/0194022 A1 | 8/2006 | Boutilier et al. |
| 2006/0269706 A1 | 11/2006 | Shannon et al. |
| 2007/0020315 A1 | 1/2007 | Shannon et al. |
| 2007/0131366 A1 | 6/2007 | Underhill et al. |
| 2007/0137813 A1 | 6/2007 | Nickel et al. |
| 2007/0137814 A1 | 6/2007 | Gao |
| 2007/0170610 A1 | 7/2007 | Payne et al. |
| 2007/0240842 A1 | 10/2007 | Scherb et al. |
| 2007/0251659 A1 | 11/2007 | Fernandes et al. |
| 2007/0251660 A1 | 11/2007 | Walkenhaus et al. |
| 2007/0267157 A1 | 11/2007 | Kanitz et al. |
| 2007/0272381 A1 | 11/2007 | Elony et al. |
| 2007/0275866 A1 | 11/2007 | Dykstra |
| 2007/0298221 A1 | 12/2007 | Vinson |
| 2008/0035289 A1 | 2/2008 | Edwards et al. |
| 2008/0076695 A1 | 3/2008 | Uitenbroek et al. |
| 2008/0156450 A1 | 7/2008 | Klerelid et al. |
| 2008/0199655 A1 | 8/2008 | Monnerie et al. |
| 2008/0245498 A1 | 10/2008 | Ostendorf et al. |
| 2008/0302493 A1 | 12/2008 | Boatman et al. |
| 2008/0308247 A1 | 12/2008 | Ringer et al. |
| 2008/0314535 A1* | 12/2008 | Hilbig .......... D21H 27/40 162/109 |
| 2009/0020248 A1 | 1/2009 | Sumnicht et al. |
| 2009/0056892 A1 | 3/2009 | Rekoske |
| 2009/0061709 A1 | 3/2009 | Nakai et al. |
| 2009/0205797 A1 | 8/2009 | Fernandes et al. |
| 2009/0218056 A1 | 9/2009 | Manifold et al. |
| 2010/0065234 A1 | 3/2010 | Klerelid et al. |
| 2010/0119779 A1 | 5/2010 | Ostendorf et al. |
| 2010/0224338 A1 | 9/2010 | Harper et al. |
| 2010/0230064 A1 | 9/2010 | Eagles et al. |
| 2010/0236034 A1 | 9/2010 | Eagles et al. |
| 2010/0239825 A1 | 9/2010 | Sheehan et al. |
| 2010/0272965 A1 | 10/2010 | Schinkoreit et al. |
| 2011/0027545 A1 | 2/2011 | Harlacher et al. |
| 2011/0180223 A1 | 7/2011 | Klerelid et al. |
| 2011/0189435 A1 | 8/2011 | Manifold et al. |
| 2011/0189442 A1 | 8/2011 | Manifold et al. |
| 2011/0206913 A1 | 8/2011 | Manifold et al. |
| 2011/0223381 A1 | 9/2011 | Sauter et al. |
| 2011/0253329 A1 | 10/2011 | Manifold et al. |
| 2011/0265967 A1 | 11/2011 | Van Phan |
| 2011/0303379 A1 | 12/2011 | Boechat et al. |
| 2012/0144611 A1 | 6/2012 | Baker et al. |
| 2012/0152475 A1 | 6/2012 | Edwards et al. |
| 2012/0177888 A1 | 7/2012 | Escafere et al. |
| 2012/0244241 A1 | 9/2012 | McNeil |
| 2012/0267063 A1 | 10/2012 | Klerelid et al. |
| 2012/0297560 A1 | 11/2012 | Zwick et al. |
| 2013/0008135 A1 | 1/2013 | Moore et al. |
| 2013/0029105 A1 | 1/2013 | Miller et al. |
| 2013/0029106 A1 | 1/2013 | Lee et al. |
| 2013/0133851 A1 | 5/2013 | Boechat et al. |
| 2013/0150817 A1 | 6/2013 | Kainth et al. |
| 2013/0160960 A1 | 6/2013 | Hermans et al. |
| 2013/0209749 A1 | 8/2013 | Myangiro et al. |
| 2013/0248129 A1 | 9/2013 | Manifold et al. |
| 2013/0327487 A1 | 12/2013 | Espinosa et al. |
| 2014/0004307 A1 | 1/2014 | Sheehan |
| 2014/0041820 A1 | 2/2014 | Ramaratnam et al. |
| 2014/0041822 A1 | 2/2014 | Boechat et al. |
| 2014/0050890 A1 | 2/2014 | Zwick et al. |
| 2014/0053994 A1 | 2/2014 | Manifold et al. |
| 2014/0096924 A1 | 4/2014 | Rekoske et al. |
| 2014/0182798 A1 | 7/2014 | Polat et al. |
| 2014/0242320 A1 | 8/2014 | McNeil et al. |
| 2014/0272269 A1 | 9/2014 | Hansen |
| 2014/0272747 A1 | 9/2014 | Ciurkot |
| 2014/0284237 A1 | 9/2014 | Gosset |
| 2014/0360519 A1 | 12/2014 | George et al. |
| 2015/0059995 A1 | 3/2015 | Ramaratnam et al. |
| 2015/0102526 A1 | 4/2015 | Ward et al. |
| 2015/0129145 A1 | 5/2015 | Chou et al. |
| 2015/0211179 A1 | 7/2015 | Alias et al. |
| 2015/0241788 A1 | 8/2015 | Yamaguchi |
| 2015/0330029 A1 | 11/2015 | Ramaratnam et al. |
| 2016/0060811 A1 | 3/2016 | Riding et al. |
| 2016/0090692 A1 | 3/2016 | Eagles et al. |
| 2016/0090693 A1 | 3/2016 | Eagles et al. |
| 2016/0130762 A1 | 5/2016 | Ramaratnam et al. |
| 2016/0145810 A1 | 5/2016 | Miller, IV et al. |
| 2016/0159007 A1 | 6/2016 | Miller, IV et al. |
| 2016/0160448 A1 | 6/2016 | Miller, IV et al. |
| 2016/0185041 A1 | 6/2016 | Topolkaraev et al. |
| 2016/0185050 A1 | 6/2016 | Topolkaraev et al. |
| 2016/0273168 A1 | 9/2016 | Ramaratnam et al. |
| 2016/0273169 A1 | 9/2016 | Ramaratnam et al. |
| 2016/0289897 A1 | 10/2016 | Ramaratnam et al. |
| 2016/0289898 A1 | 10/2016 | Ramaratnam et al. |
| 2017/0044717 A1 | 2/2017 | Quigley |
| 2017/0101741 A1 | 4/2017 | Sealey et al. |
| 2017/0167082 A1 | 6/2017 | Ramaratnam et al. |
| 2017/0226698 A1 | 8/2017 | LeBrun et al. |
| 2017/0233946 A1 | 8/2017 | Sealey et al. |
| 2017/0253422 A1 | 9/2017 | Anklam et al. |
| 2017/0268178 A1 | 9/2017 | Ramaratnam et al. |

FOREIGN PATENT DOCUMENTS

| | | |
|---|---|---|
| CN | 1138356 A | 12/1996 |
| CN | 1207149 A | 2/1999 |
| CN | 1244899 A | 2/2000 |
| CN | 1268559 A | 10/2000 |
| CN | 1377405 A | 10/2002 |
| CN | 2728254 Y | 9/2005 |
| DE | 4242539 A1 | 8/1993 |
| EP | 0097036 A2 | 12/1983 |
| EP | 0979895 A1 | 2/2000 |
| EP | 1911574 A1 | 1/2007 |
| EP | 1339915 B1 | 7/2007 |
| EP | 2123826 A2 | 5/2009 |
| GB | 946093 A | 1/1964 |
| JP | 2013208298 A | 10/2013 |
| JP | 2014213138 A | 11/2014 |
| WO | 96/06223 A1 | 2/1996 |

(56) References Cited

FOREIGN PATENT DOCUMENTS

| | | | |
|---|---|---|---|
| WO | 200382550 | A2 | 10/2003 |
| WO | 200445834 | A1 | 6/2004 |
| WO | 2007070145 | A1 | 6/2007 |
| WO | 2008019702 | A1 | 2/2008 |
| WO | 2009006709 | A1 | 1/2009 |
| WO | 2009/061079 | A1 | 5/2009 |
| WO | 2009067079 | A1 | 5/2009 |
| WO | 2011028823 | A1 | 3/2011 |
| WO | 2012003360 | A2 | 1/2012 |
| WO | 2013024297 | A1 | 2/2013 |
| WO | 2013136471 | A1 | 9/2013 |
| WO | 2014/022848 | A1 | 2/2014 |
| WO | 201500755 | A1 | 1/2015 |
| WO | 2015/176063 | A1 | 11/2015 |
| WO | 2016/077594 | A1 | 5/2016 |
| WO | 2016/086019 | A1 | 6/2016 |
| WO | 2016/090242 | A1 | 6/2016 |
| WO | 2016/090364 | A1 | 6/2016 |
| WO | 2016085704 | A1 | 6/2016 |
| WO | 2017066465 | A1 | 4/2017 |
| WO | 2017066656 | A1 | 4/2017 |
| WO | 2017139786 | A1 | 8/2017 |

OTHER PUBLICATIONS

Written Opinion of International Searching Authority for PCT/US17/17705 dated Jun. 9, 2017.
International Search Report for PCT/US2016/057163 dated Dec. 23, 2016.
Written Opinion of International Searching Authority for PCT/US2016/057163 dated Dec. 23, 2016.
International Search Report for PCT/US2017/029890 dated Jul. 14, 2017.
Written Opinion of International Searching Authority for PCT/US2017/029890 dated Jul. 14, 2017.
International Searching Authority for PCT/US2017/032746 dated Aug. 7, 2017.
Written Opinion of International Searching Authority for PCT/US2017/032746 dated Aug. 7, 2017.
Written Opinion of International Searching Authority for PCT/US15/62483 dated May 6, 2016.
International Search Report for PCT/US15/63986 dated Mar. 29, 2016.
Written Opinion of International Searching Authority for PCT/US15/63986 dated Mar. 29, 2016.
International Search Report for PCT/US15/64284 dated Feb. 11, 2016.
Written Opinion of International Searching Authority for PCT/US15/64284 dated Feb. 11, 2016.
International Search Report for PCT/US13/53593 dated Dec. 30, 2013.
Written Opinion of International Searching Authority for PCT/US13/53593 dated Dec. 30, 2013.
International Search Report for PCT/US15/31411 dated Aug. 13, 2015.
Written Opinion of International Searching Authority for PCT/US15/31411 dated Aug. 13, 2015.
International Search Report for PCT/US15/60398 dated Jan. 29, 2016.
Written Opinion of International Searching Authority for PCT/US15/60398 dated Jan. 29, 2016.
International Search Report for PCT/US15/62483 dated Mar. 6, 2016.
International Preliminary Report on Patentability of PCT/US2013/053593 dated Feb. 3, 2015.
Supplementary European Search Report of EP 13 82 6461 dated Apr. 1, 2016.
International Search Report of the International Searching Authority relating to International Application No. PCT/US2016/56871, dated Jan. 12, 2017.
Written Opinion relating to International Application No. PCT/US2016/56871, dated Jan. 12, 2017.

\* cited by examiner

US 10,954,635 B2

DISPOSABLE TOWEL PRODUCED WITH LARGE VOLUME SURFACE DEPRESSIONS

RELATED APPLICATIONS

This application is a continuation of U.S. patent application Ser. No. 15/292,991, filed Oct. 13, 2016 and entitled DISPOSABLE TOWEL PRODUCED WITH LARGE VOLUME SURFACE DEPRESSIONS, which in turn claims priority to U.S. Provisional Application 62/240,880, filed Oct. 13, 2015, entitled DISPOSABLE TOWEL PRODUCED WITH LARGE VOLUME SURFACE DEPRESSIONS, the contents of which are incorporated herein by reference in their entirety.

FIELD OF THE INVENTION

The present invention relates to a disposable two-ply tissue or paper towel with unique surface topography and large volume surface depressions.

BACKGROUND

Across the globe there is great demand for disposable paper products. In the North American market, the demand is increasing for higher quality products offered at a reasonable price point. A critical attribute for consumers of disposable sanitary tissue and paper towels are softness, strength, and absorbency.

Softness is the pleasing tactile sensation the consumer perceives when using the tissue product as it is moved across his or her skin or crumpled in his or her hand. The tissue physical attributes which affect softness are primarily surface smoothness and bulk structure.

Various manufacturing systems and methods have been developed that produce soft, strong and absorbent structured paper towel or tissue products. However, such systems and methods are often deficient in their ability to provide sufficient bulk structure to the final product, which in turn does not allow for optimal softness and absorbency.

SUMMARY OF THE INVENTION

An object of the present invention is to provide a disposable tissue or paper towel with unique and quantifiable surface topography attributes.

A disposable tissue or paper towel product according to an exemplary embodiment of the present invention comprises at least two plies, an exposed outer surface of at least one of the two plies comprising a plurality of pockets, the plurality of pockets having an average volume greater than 0.4 mm$^3$ and an average surface area of 2.5 mm$^2$.

A disposable tissue or paper towel product according to an exemplary embodiment of the present invention comprises at least two plies, an exposed outer surface of at least one of the two plies comprising a plurality of pockets, the plurality of pockets having an average volume greater than 0.4 mm$^3$ and an average surface area of 2.5 mm$^2$, the disposable tissue or paper towel product having a basis weight less than 43 gsm.

A disposable tissue or paper towel product according to an exemplary embodiment of the present invention comprises at least two plies, an exposed outer surface of at least one of the two plies comprising a plurality of pockets, the plurality of pockets having an average volume greater than 0.4 mm$^3$, the disposable tissue or paper towel product having a basis weight less than 45 gsm.

In at least one exemplary embodiment, the product is formed using a structured fabric of a through air dying process.

In at least one exemplary embodiment, the product is formed using one of the following types of wet-laid forming processes: Through Air Drying (TAD), Uncreped Through Air Drying (UCTAD), Advanced Tissue Molding System (ATMOS), NTT, and ETAD.

In at least one exemplary embodiment, the at least two plies are laminated together.

In at least one exemplary embodiment, the at least two plies are laminated together with heated adhesive.

In at least one exemplary embodiment, the structured fabric is made of warp and weft monofilament yarns.

In at least one exemplary embodiment, the diameter of the warp monofilament yarn is 0.40 mm.

In at least one exemplary embodiment, the diameter of the weft monofilament yarn is 0.550 mm.

In at least one exemplary embodiment, the diameter of the warp monofilament yarn is 0.30 mm to 0.550 mm.

In at least one exemplary embodiment, the diameter of the weft monofilament yarn is 0.30 to 0.550 mm.

In at least one exemplary embodiment, the through air drying process comprises transferring a web that forms the at least one of the two plies from a forming wire to the structured fabric at a 5% or more speed differential.

BRIEF DESCRIPTION OF THE DRAWINGS

The features and advantages of exemplary embodiments of the present invention will be more fully understood with reference to the following, detailed description when taken in conjunction with the accompanying figures, wherein.

DETAILED DESCRIPTION

Figure 1:
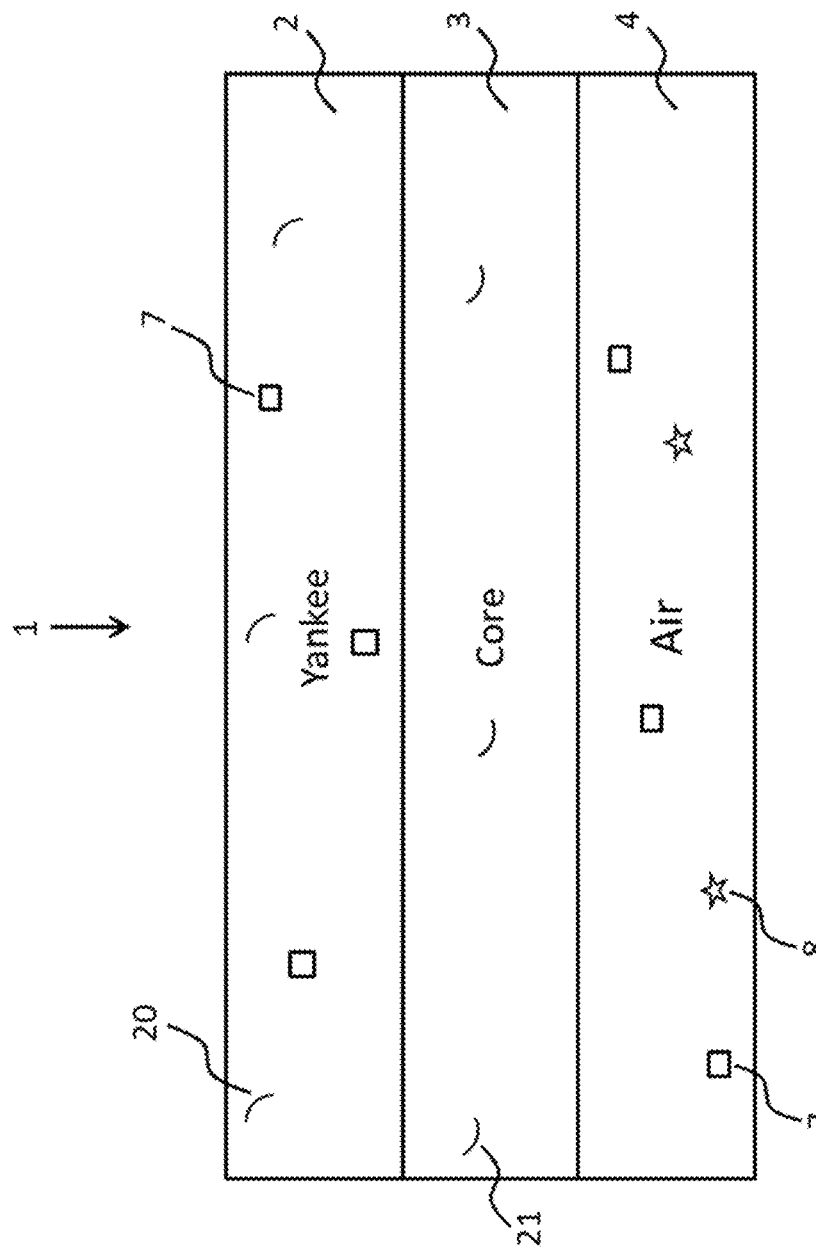
FIG. 1 is a schematic diagram of a three layer ply formed by a wet laid process for use in an exemplary embodiment of the present invention.

A disposable structured tissue or paper towel product according to an exemplary embodiment of the present invention includes two or more plies of absorbent products/web, where each ply is produced using a unique set of operating conditions and structured fabric, thereby resulting in a paper towel or tissue product with large volume depressions or "pockets" across its surface. In particular, in accordance with an exemplary embodiment of the present invention, a disposable structured tissue or paper towel product is made using a structured fabric of a through air drying process in which a nascent web is transferred from a forming wire to the structured fabric at a speed differential of 0% to 20%, preferably 0% to 10%, and more preferably 0% to 5%. In an exemplary embodiment, the speed differential is 5%. The structured fabric is made of warp and weft monofilament yarns, with the diameter of both the warp and weft yarns being in the range of 0.3 mm to 0.550 mm. In an exemplary embodiment, the diameter of the warp yarn is 0.40 mm and the diameter of the weft yarn is 0.550 mm.

Surface smoothness of a ply/web is primarily a function of the surface topography of the web. The surface topography is influenced by the manufacturing method such as conventional dry crepe, through air drying (TAD), or hybrid technologies such as Metso's NTT, Georgia Pacific's ETAD, or Voith's ATMOS process. The manufacturing method of conventional dry crepe creates a surface topography that is primarily influenced by the creping process (doctoring a flat, pressed sheet off of a steam pressurized drying cylinder) versus TAD and hybrid technologies which create a web whose surface topography is influenced primarily by the structured fabric pattern that is imprinted into the sheet and secondarily influenced by the degree of fabric crepe and conventional creping utilized. A structured fabric is made up of monofilament polymeric fibers with a weave pattern that creates raised knuckles and depressed valleys to allow for a web with high Z-direction thickness and unique surface topography. Therefore, the design of the structured fabric is important in controlling the softness and quality attributes of the web. U.S. Pat. No. 3,301,746 discloses the first structured or imprinting fabric designed for production of tissue. A structured fabric may also contain an overlaid hardened photosensitive resin to create a unique surface topography and bulk structure as shown in U.S. Pat. No. 4,529,480.

Fabric crepe is the process of using speed differential between a forming and structured fabric to facilitate filling the valleys of the structured fabric with fiber, and folding the web in the Z-direction to create thickness and influence surface topography. Conventional creping is the use of a doctor blade to remove a web that is adhered to a steam heated cylinder, coated with an adhesive chemistry, in conjunction with speed differential between the Yankee dryer and reel drum to fold the web in the Z-direction to create thickness, drape, and to influence the surface topography of the web. The process of calendering, pressing the web between cylinders, will also affect surface topography. The surface topography can also be influenced by the coarseness and stiffness of the fibers used in the web, degree of fiber refining, as well as embossing in the converting process. Added chemical softeners and lotions can also affect the perception of smoothness by creating a lubricious surface coating that reduces friction between the web and the skin of the consumer.

The bulk structure of the web is influenced primarily by web thickness and flexibility (or drape). TAD and Hybrid Technologies have the ability to create a thicker web since structured fabrics, fabric crepe, and conventional creping can be utilized while conventional dry crepe can only utilize conventional creping, and to a lesser extent basis weight/grammage, to influence web thickness. The increase in thickness of the web through embossing does not improve softness since the thickness comes by compacting sections of the web and pushing these sections out of the plane of the web. Plying two or more webs together in the converting process, to increase the finished product thickness, is also an effective method to improve bulk structure softness.

The flexibility, or drape, of the web is primarily affected by the overall web strength and structure. Strength is the ability of a paper web to retain its physical integrity during use and is primarily affected by the degree of cellulose fiber to fiber hydrogen bonding, and ionic and covalent bonding between the cellulose fibers and polymers added to the web. The stiffness of the fibers themselves, along with the degree of fabric and conventional crepe utilized, and the process of embossing will also influence the flexibility of the web. The structure of the sheet, or orientation of the fibers in all three dimensions, is primarily affected by the manufacturing method used.

The predominant manufacturing method for making a tissue web is the conventional dry crepe process. The major steps of the conventional dry crepe process involve stock preparation, forming, pressing, drying, creping, calendering (optional), and reeling the web. This method is the oldest form of modern tissue making and is thus well understood and easy to operate at high speeds and production rates. Energy consumption per ton is low since nearly half of the water removed from the web is through drainage and mechanical pressing. Unfortunately, the sheet pressing also compacts the web which lowers web thickness resulting in a product that is of low softness and quality. Attempts to improve the web thickness on conventional dry crepe machines have primarily focused on lowering the nip intensity (longer nip width and lower nip pressure) in the press section by using extended nip presses (shoe presses) rather than a standard suction pressure roll. After pressing the sheet, between a suction pressure roll and a steam heated cylinder (referred to as a Yankee dryer), the web is dried from up to 50% solids to up to 99% solids using the steam heated cylinder and hot air impingement from an air system (air cap or hood) installed over the steam cylinder. The sheet is then creped from the steam cylinder using a steel or ceramic doctor blade. This is a critical step in the conventional dry crepe process. The creping process greatly affects softness as the surface topography is dominated by the number and coarseness of the crepe bars (finer crepe is much smoother than coarse crepe). Some thickness and flexibility is also generated during the creping process. After creping, the web is optionally calendered and reeled into a parent roll and ready for the converting process.

The through air dried (TAD) process is another manufacturing method for making a tissue web. The major steps of the through air dried process are stock preparation, forming, imprinting, thermal pre-drying, drying, creping, calendering (optional), and reeling the web. Rather than pressing and compacting the web, as is performed in conventional dry crepe, the web undergoes the steps of imprinting and thermal pre-drying. Imprinting is a step in the process where the web is transferred from a forming fabric to a structured fabric (or imprinting fabric) and subsequently pulled into the structured fabric using vacuum (referred to as imprinting or molding). This step imprints the weave pattern (or knuckle pattern) of the structured fabric into the web. This imprinting step has a tremendous effect on the softness of the web, both affecting smoothness and the bulk structure. The design parameters of the structured fabric (weave pattern, mesh, count, warp and weft monofilament diameters, caliper, air permeability, and optional over-laid polymer) are therefore critical to the development of web softness. After imprinting, the web is thermally pre-dried by moving hot air through the web while it is conveyed on the structured fabric. Thermal pre-drying can be used to dry to the web over 90% solids before it is transferred to a steam heated cylinder. The web is then transferred from the structured fabric to the steam heated cylinder though a very low intensity nip (up to 10 times less than a conventional press nip) between a solid pressure roll and the steam heated cylinder. The only portions of the web that are pressed between the pressure roll and steam cylinder rest on knuckles of the structured fabric, thereby protecting most of the web from the light compaction that occurs in this nip. The steam cylinder and an optional air cap system, for impinging hot air, then dry the sheet to up to 99% solids during the drying stage before creping occurs. The creping step of the process again only affects the knuckle sections of the web that are in contact with the steam cylinder surface. Due to only the knuckles of the web being creped, along with the dominant surface topography being generated by the structured fabric, and the higher thickness of the TAD web, the creping process has much smaller effect on overall softness as compared to conventional dry crepe. After creping, the web is optionally calendered and reeled into a parent roll and ready for the converting process. Examples of patents which describe creped through air dried products includes U.S. Pat. Nos. 3,994,771; 4,102,737; 4,529,480 and 5,510,002.

A variation of the TAD process where the sheet is not creped, but rather dried to up to 99% using thermal drying and blown off the structured fabric (using air) to be optionally calendered and reeled also exits. This process is called UCTAD or un-creped through air drying process. U.S. Pat. No. 5,607,551 describes an uncreped through air dried product.

The softness attributes of the TAD process are superior to conventional dry crepe due to the ability to produce superior web bulk structure (thicker, un-compacted) with similar levels of smoothness. Unfortunately, the machinery is roughly double the cost compared to that of a conventional tissue machine and the operational cost is higher due to its energy intensity and complexity to operate.

A new process/method and paper machine system for producing tissue has been developed by the Voith company (Voith GmbH, of Heidenheim, Germany) and is being marketed under the name ATMOS (Advanced Tissue Molding System). The process/method and paper machine system has several patented variations, but all involve the use of a structured fabric in conjunction with a belt press. The major steps of the ATMOS process and its variations are stock preparation, forming, imprinting, pressing (using a belt press), creping, calendering (optional), and reeling the web.

The stock preparation step is the same as a conventional or TAD machine would utilize. The purpose is to prepare the proper recipe of fibers, chemical polymers, and additives that are necessary for the grade of tissue being produced, and diluting this slurry to allow for proper web formation when deposited out of the machine headbox (single, double, or triple layered) to the forming surface. The forming process can use a twin wire former (as described in U.S. Pat. No. 7,744,726) a Crescent Former with a suction Forming Roll (as described in U.S. Pat. No. 6,821,391), or preferably a Crescent Former (as described in U.S. Pat. No. 7,387,706). The preferred former is provided a slurry from the headbox to a nip formed by a structured fabric (inner position/in contact with the forming roll) and forming fabric (outer position). The fibers from the slurry are predominately collected in the valleys (or pockets, pillows) of the structured fabric and the web is dewatered through the forming fabric. This method for forming the web results in a unique bulk structure and surface topography as described in U.S. Pat. No. 7,387,706 (FIG. 1 through FIG. 11). The fabrics separate after the forming roll with the web staying in contact with the structured fabric. At this stage, the web is already imprinted by the structured fabric, but use of a vacuum box on the inside of the structured fabric can facilitate further fiber penetration into the structured fabric and a deeper imprint.

The web is now transported on the structured fabric to a belt press. The belt press can have multiple configurations. The first patented belt press configurations used in conjunction with a structured fabric can be viewed in U.S. Pat. No. 7,351,307 (FIG. 13), where the web is pressed against a dewatering fabric across a vacuum roll by an extended nip belt press. The press dewaters the web while protecting the areas of the sheet within the structured fabric valleys from compaction. Moisture is pressed out of the web, through the dewatering fabric, and into the vacuum roll. The press belt is permeable and allows for air to pass through the belt, web, and dewatering fabric, into the vacuum roll enhancing the moisture removal. Since both the belt and dewatering fabric are permeable, a hot air hood can be placed inside of the belt press to further enhance moisture removal as shown in FIG. 14 of U.S. Pat. No. 7,351,307. Alternately, the belt press can have a pressing device arranged within the belt which includes several press shoes, with individual actuators to control cross direction moisture profile, (see FIG. 28 in U.S. Pat. Nos. 7,951,269 or 8,118,979 or FIG. 20 of U.S. Pat. No. 8,440,055) or a press roll (see FIG. 29 in U.S. Pat. Nos. 7,951,269 or 8,118,979 or FIG. 21 of U.S. Pat. No. 8,440,055). The preferred arrangement of the belt press has the web pressed against a permeable dewatering fabric across a vacuum roll by a permeable extended nip belt press. Inside the belt press is a hot air hood that includes a steam shower to enhance moisture removal. The hot air hood apparatus over the belt press can be made more energy efficient by reusing a portion of heated exhaust air from the Yankee air cap or recirculating a portion of the exhaust air from the hot air apparatus itself (see U.S. Pat. No. 8,196,314). Further embodiments of the drying system composed of the hot air apparatus and steam shower in the belt press section are described in U.S. Pat. Nos. 8,402,673; 8,435,384 and 8,544,184.

After the belt press is a second press to nip the web between the structured fabric and dewatering felt by one hard and one soft roll. The press roll under the dewatering fabric can be supplied with vacuum to further assist water removal. This preferred belt press arrangement is described in U.S. Pat. Nos. 8,382,956 and 8,580,083, with FIG. 1 showing the arrangement. Rather than sending the web through a second press after the belt press, the web can travel through a boost dryer (FIG. 15 of U.S. Pat. Nos. 7,387,706 or 7,351,307), a high pressure through air dryer (FIG. 16 of U.S. Pat. Nos. 7,387,706 or 7,351,307), a two pass high pressure through air dryer (FIG. 17 of U.S. Pat. Nos. 7,387,706 or 7,351,307) or a vacuum box with hot air supply hood (FIG. 2 of U.S. Pat. No. 7,476,293). U.S. Pat. Nos. 7,510,631; 7,686,923; 7,931,781; 8,075,739 and 8,092,652 further describe methods and systems for using a belt press and structured fabric to make tissue products each having variations in fabric designs, nip pressures, dwell times, etc. and are mentioned here for reference. A wire turning roll can be also be utilized with vacuum before the sheet is transferred to a steam heated cylinder via a pressure roll nip (see FIG. 2a of U.S. Pat. No. 7,476,293).

The sheet is now transferred to a steam heated cylinder via a press element. The press element can be a through drilled (bored) pressure roll (FIG. 8 of U.S. Pat. No. 8,303,773), a through drilled (bored) and blind drilled (blind bored) pressure roll (FIG. 9 of U.S. Pat. No. 8,303,773), or a shoe press (U.S. Pat. No. 7,905,989). After the web leaves this press element to the steam heated cylinder, the % solids are in the range of 40-50% solids. The steam heated cylinder is coated with chemistry to aid in sticking the sheet to the cylinder at the press element nip and also aid in removal of the sheet at the doctor blade. The sheet is dried to up to 99% solids by the steam heated cylinder and installed hot air impingement hood over the cylinder. This drying process, the coating of the cylinder with chemistry, and the removal of the web with doctoring is explained in U.S. Pat. Nos. 7,582,187 and 7,905,989. The doctoring of the sheet off the Yankee, creping, is similar to that of TAD with only the knuckle sections of the web being creped. Thus the dominant surface topography is generated by the structured fabric, with the creping process having a much smaller effect on overall softness as compared to conventional dry crepe.

The web is now calendered (optional,) slit, and reeled and ready for the converting process. These steps are described in U.S. Pat. No. 7,691,230.

The preferred ATMOS process has the following steps: Forming the web using a Crescent Former between an outer forming fabric and inner structured fabric, imprinting the pattern of the structured fabric into the web during forming with the aid of a vacuum box on the inside of the structured fabric after fabric separation, pressing (and dewatering) the web against a dewatering fabric across a vacuum roll using an extended nip belt press belt, using a hot air impingement hood with a steam shower inside the belt press to aid in moisture removal, reuse of exhaust air from the Yankee hot air hood as a percentage of makeup air for the belt press hot air hood for energy savings, use of a second press nip between a hard and soft roll with a vacuum box installed in the roll under the dewatering fabric for further dewatering, transferring the sheet to a steam heated cylinder (Yankee cylinder) using a blind and through drilled press roll (for further dewatering), drying the sheet on the steam cylinder with the aid of a hot air impingement hood over the cylinder, creping, calendering, slitting, and reeling the web.

The benefits of this preferred process are numerous. First, the installed capital cost is only slightly above that of a conventional crescent forming tissue machine and thus nearly half the cost of a TAD machine. The energy costs are equal to that of a conventional tissue machine which are half that of a TAD machine. The thickness of the web is nearly equal to that of a TAD product and up to 100% thicker than a conventional tissue web. The quality of the products produced in terms of softness and strength are comparable to TAD and greater than that produced from a conventional tissue machine. The softness attributes of smoothness and bulk structure are unique and different from that of TAD and conventional tissue products and are not only a result of the unique forming systems (a high percentage of the fibers are collected in the valleys of the structured fabric and are protected from compaction through the process) and dewatering systems (extended nip belted press allows for low nip intensity and less web compaction) of the ATMOS process itself, but also the controllable parameters of the process (fiber selection, chemistry selection, degree of refining, structured fabric used, Yankee coating chemistry, creping pocket angle, creping moisture, and amount of calendering). The ATMOS manufacturing technique is often described as a hybrid technology because it uses a structured fabric like the TAD process, but also uses energy efficient means to dewater the sheet like the conventional dry crepe process.

Other manufacturing techniques which employ the use of a structured fabric along with an energy efficient dewatering process are the ETAD process and NTT process. The ETAD process and products can be viewed in U.S. Pat. Nos. 7,339,378; 7,442,278 and 7,494,563. This process can use any type of former such as a Twin Wire Former or Crescent Former. After formation and initial drainage in the forming section, the web is transferred to a press fabric where it is conveyed across a suction vacuum roll for water removal, increasing web solids up to 25%. Then the web travels into a nip formed by a shoe press and backing/transfer roll for further water removal, increasing web solids up to 50%. At this nip, the web is transferred onto the transfer roll and then onto a structured fabric via a nip formed by the transfer roll and a creping roll. At this transfer point, speed differential can be used to facilitate fiber penetration into the structured fabric and build web caliper. The web then travels across a molding box to further enhance fiber penetration if needed. The web is then transferred to a Yankee dryer where is can be optionally dried with a hot air impingement hood, creped, calendared, and reeled. The NTT process and products can be viewed in international patent application publication WO 2009/061079 A1. The process has several embodiments, but the key step is the pressing of the web in a nip formed between a structured fabric and press felt. The web contacting surface of the structured fabric is a non-woven material with a three dimensional structured surface comprised of elevation and depressions of a predetermined size and depth. As the web is passed through this nip, the web is formed into the depression of the structured fabric since the press fabric is flexible and will reach down into all of the depressions during the pressing process. When the felt reaches the bottom of the depression, hydraulic force is built up which forces water from the web and into the press felt. To limit compaction of the web, the press rolls will have a long nip width which can be accomplished if one of the rolls is a shoe press. After pressing, the web travels with the structured fabric to a nip with the Yankee dryer, where the sheet is optionally dried with a hot air impingement hood, creped, calendared, and reeled.

According to exemplary embodiments of the present invention, the absorbent products or structures that are used for each of the two or more webs/plies can be manufactured by any known or later-discovered wet-laid methods that use a structured fabric. Examples of such wet-laid technologies include Through Air Drying (TAD), Uncreped Through Air Drying (UCTAD), Advanced Tissue Molding System (ATMOS), NTT, and ETAD.

The materials used to produce the disposable structured tissue or paper towel product can be fibers in any ratio selected from cellulosic-based fibers, such as wood pulps (softwood gymnosperms or hardwood angiosperms), *Cannabis*, cotton, regenerated or spun cellulose, jute, flax, ramie, bagasse, kenaf, or other plant based cellulosic fiber sources. Synthetic fibers, such as a polyolefin (e.g., polypropylene), polyester, or polylactic acid can also be used. Each ply of a multi-ply absorbent product of the present invention may comprise cellulosic based fibers and/or synthetic fibers. Also, all the plies may be made of the same type(s) of fibers or different fibers may be used in some or all of the plies.

Figure 2:
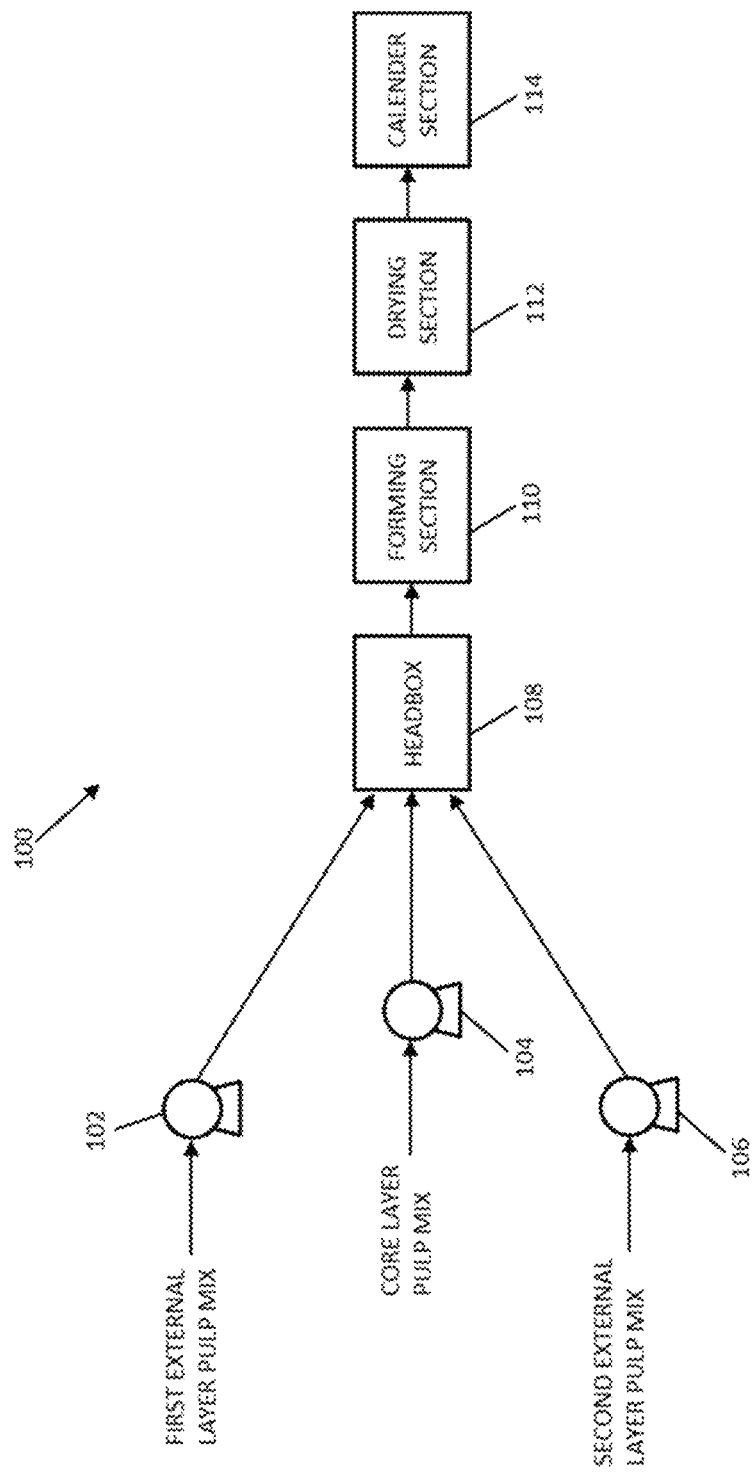
FIG. 2 is a block diagram of a system for manufacturing one ply of a laminate according to an exemplary embodiment of the present invention.

FIGS. 1 and 2 illustrate a single ply absorbent product and a method for manufacturing the tissue product in which a TAD drying method is used. The content of U.S. patent application Ser. No. 13/837,685, which describes such an absorbent, soft TAD tissue and is assigned to applicant, is incorporated herein by reference.

FIG. 1 shows an example of a single ply, three layer tissue generally designated by reference number 1 that has external (exterior) layers 2 and 4 as well as an internal (interior), core layer 3. In the figure, the three layers of the tissue from top to bottom are labeled as air 4, core 3 and dry (or Yankee) 2. External layer 2 is composed primarily of hardwood fibers 20 whereas external layer 4 and core layer 3 are composed of a combination of hardwood fibers 20 and softwood fibers 21. External layer 2 further includes a dry strength additive 7. External layer 4 further includes both a dry strength additive 7 and a temporary wet strength additive 8.

Pulp mixes for exterior layers of the tissue are prepared with a blend of primarily hardwood fibers. For example, the pulp mix for at least one exterior layer is a blend containing about 70 percent or greater hardwood fibers relative to the total percentage of fibers that make up the blend. As a further example, the pulp mix for at least one exterior layer is a blend containing about 90-100 percent hardwood fibers relative to the total percentage of fibers that make up the blend.

Pulp mixes for the interior layer of the tissue are prepared with a blend of primarily softwood fibers. For example, the pulp mix for the interior layer is a blend containing about 70 percent or greater softwood fibers relative to the total percentage of fibers that make up the blend. As a further example, the pulp mix for the interior layer is a blend containing about 90-100 percent softwood fibers relative to the total percentage of fibers that make up the blend.

As known in the art, pulp mixes are subjected to a dilution stage in which water is added to the mixes so as to form a slurry. After the dilution stage but prior to reaching the headbox, each of the pulp mixes are dewatered to obtain a thick stock of about 95% water. In an exemplary embodiment of the invention, wet end additives are introduced into the thick stock pulp mixes of at least the interior layer.

In an exemplary embodiment, a dry strength additive is added to the thick stock mix for at least one of the exterior layers. The dry strength additive may be, for example, amphoteric starch, added in a range of about 1 to 40 kg/ton. In another exemplary embodiment, a wet strength additive is added to the thick stock mix for at least one of the exterior layers. The wet strength additive may be, for example, glyoxalated polyacrylamide, commonly known as GPAM, added in a range of about 0.25 to 5 kg/ton. In a further exemplary embodiment, both a dry strength additive, preferably amphoteric starch and a wet strength additive, preferably GPAM are added to one of the exterior layers. Without being bound by theory, it is believed that the combination of both amphoteric starch and GPAM in a single layer when added as wet end additives provides a synergistic effect with regard to strength of the finished tissue. Other exemplary temporary wet-strength agents include aldehyde functionalized cationic starch, aldehyde functionalized polyacrylamides, acrolein co-polymers and cis-hydroxyl polysaccharide (guar gum and locust bean gum) used in combination with any of the above mentioned compounds.

In addition to amphoteric starch, suitable dry strength additives may include but are not limited to glyoxalated polyacrylamide, cationic starch, carboxy methyl cellulose, guar gum, locust bean gum, cationic polyacrylamide, polyvinyl alcohol, anionic polyacrylamide or a combination thereof.

FIG. 2 is a block diagram of a system for manufacturing such a three layer tissue, generally designated by reference number 100, according to an exemplary embodiment of the present invention. The system 100 includes a first exterior layer fan pump 102, a core layer fan pump 104, a second exterior layer fan pump 106, a headbox 108, a forming section 110, a drying section 112 and a calender section 114. The first and second exterior layer fan pumps 102, 106 deliver the pulp mixes of the first and second external layers 2, 4 to the headbox 108, and the core layer fan pump 104 delivers the pulp mix of the core layer 3 to the headbox 108. As is known in the art, the headbox delivers a wet web of pulp onto a forming wire within the forming section 110. The wet web is then laid on the forming wire with the core layer 3 disposed between the first and second external layers 2, 4.

After formation in the forming section 110, the partially dewatered web is transferred to the drying section 112. Within the drying section 112, the tissue may be dried using through air drying processes which involve the use of a structured fabric. In an exemplary embodiment, the tissue is dried to a humidity of about 7 to 20% using a through air drier manufactured by Valmet Corporation, of Espoo, Finland. In another exemplary embodiment, two or more through air drying stages are used in series. However, it should be emphasized that this is only one of various methods of manufacturing an absorbent tissue product to be used in manufacturing the laminate of the present invention.

In an exemplary embodiment, the tissue of the present invention is patterned during the through air drying process. Such patterning can be achieved through the use of a TAD fabric, such as a G-weave (Prolux 003) or M-weave (Prolux 005) TAD fabric.

After the through air drying stage, the tissue of the present invention may be further dried in a second phase using a Yankee drying drum. In an exemplary embodiment, a creping adhesive is applied to the drum prior to the tissue contacting the drum. A creping blade is then used to remove the tissue from the Yankee drying drum. The tissue may then be calendered in a subsequent stage within the calendar section 114. According to an exemplary embodiment, calendaring may be accomplished using a number of calendar rolls (not shown) that deliver a calendering pressure in the range of 0-100 pounds per linear inch (PLI). In general, increased calendering pressure is associated with reduced caliper and a smoother tissue surface.

According to an exemplary embodiment of the invention, a ceramic coated creping blade is used to remove the tissue from the Yankee drying drum. Ceramic coated creping blades result in reduced adhesive build up and aid in achieving higher run speeds. Without being bound by theory, it is believed that the ceramic coating of the creping blades provides a less adhesive surface than metal creping blades and is more resistant to edge wear that can lead to localized spots of adhesive accumulation. The ceramic creping blades allow for a greater amount of creping adhesive to be used which in turn provides improved sheet integrity and faster run speeds.

In addition to the use of wet end additives, the tissue of the present invention may also be treated with topical or surface deposited additives. Examples of surface deposited additives include softeners for increasing fiber softness and skin lotions. Examples of topical softeners include but are not limited to quaternary ammonium compounds, including, but not limited to, the dialkyldimethylammonium salts (e.g. ditallowdimethylammonium chloride, ditallowdimethylammonium methyl sulfate, di(hydrogenated tallow)dimethyl ammonium chloride, etc.). Another class of chemical softening agents include the well-known organo-reactive polydimethyl siloxane ingredients, including amino functional polydimethyl siloxane. zinc stearate, aluminum stearate, sodium stearate, calcium stearate, magnesium stearate, spermaceti, and steryl oil.

To enhance the strength and absorbency of the structured towel or tissue, multiple plies are laminated together using, for example, a heated adhesive, as described below with respect to FIG. 3. The adhesive mixture is water soluble and includes a mixture of one or more adhesives, one or more water soluble cationic resins and water. The one or more adhesives are present in an amount of 1% to 10% by weight and may be polyvinyl alcohol, polyvinyl acetate, starch based resins and/or mixtures thereof. A water soluble cationic resin may be present in an amount of up to 10% by weight and may include polyamide-epichlorohydrin resins, glyoxalated polyacrylamide resins, polyethyleneimine resins, polyethylenimine resins, and/or mixtures thereof. The remainder of the mixture is composed of water.

Figure 3:
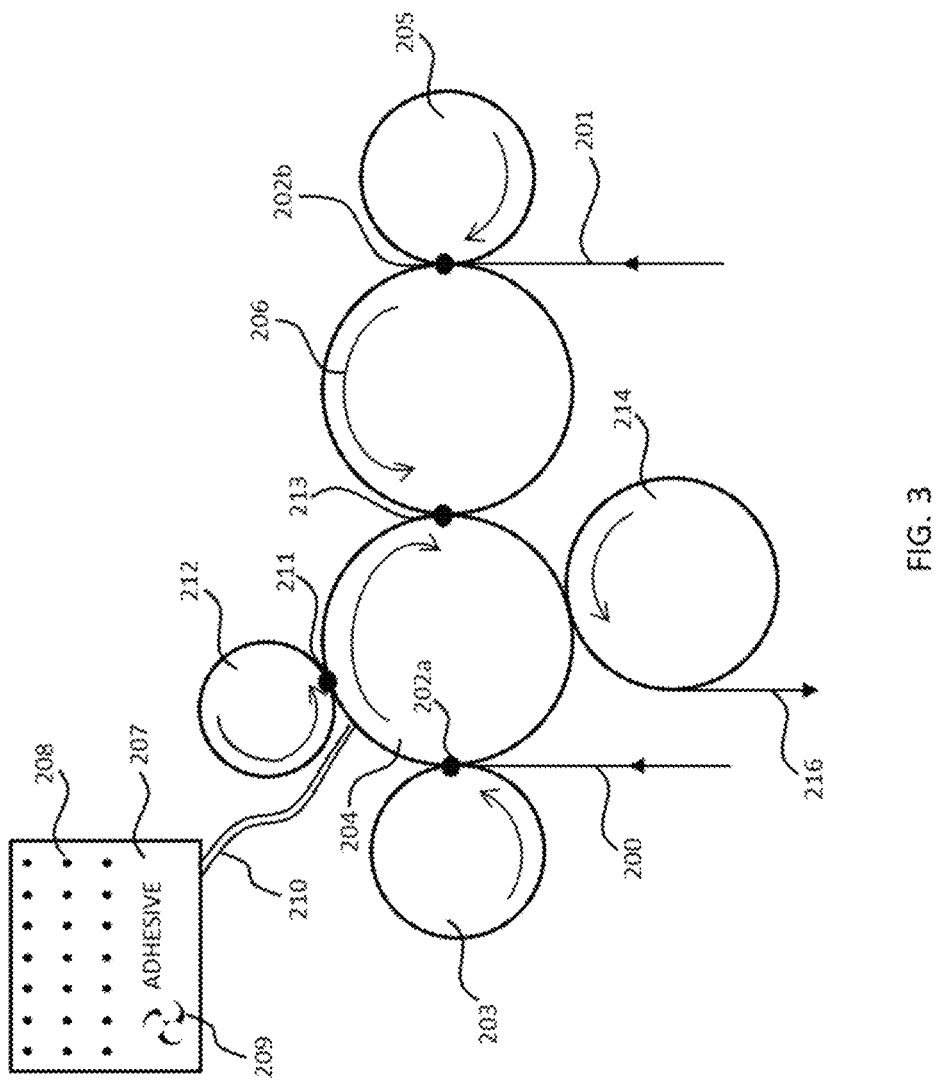
FIG. 3 is a block diagram of a system for manufacturing a multi-ply absorbent product according to an exemplary embodiment of the present invention.
Figure 4:
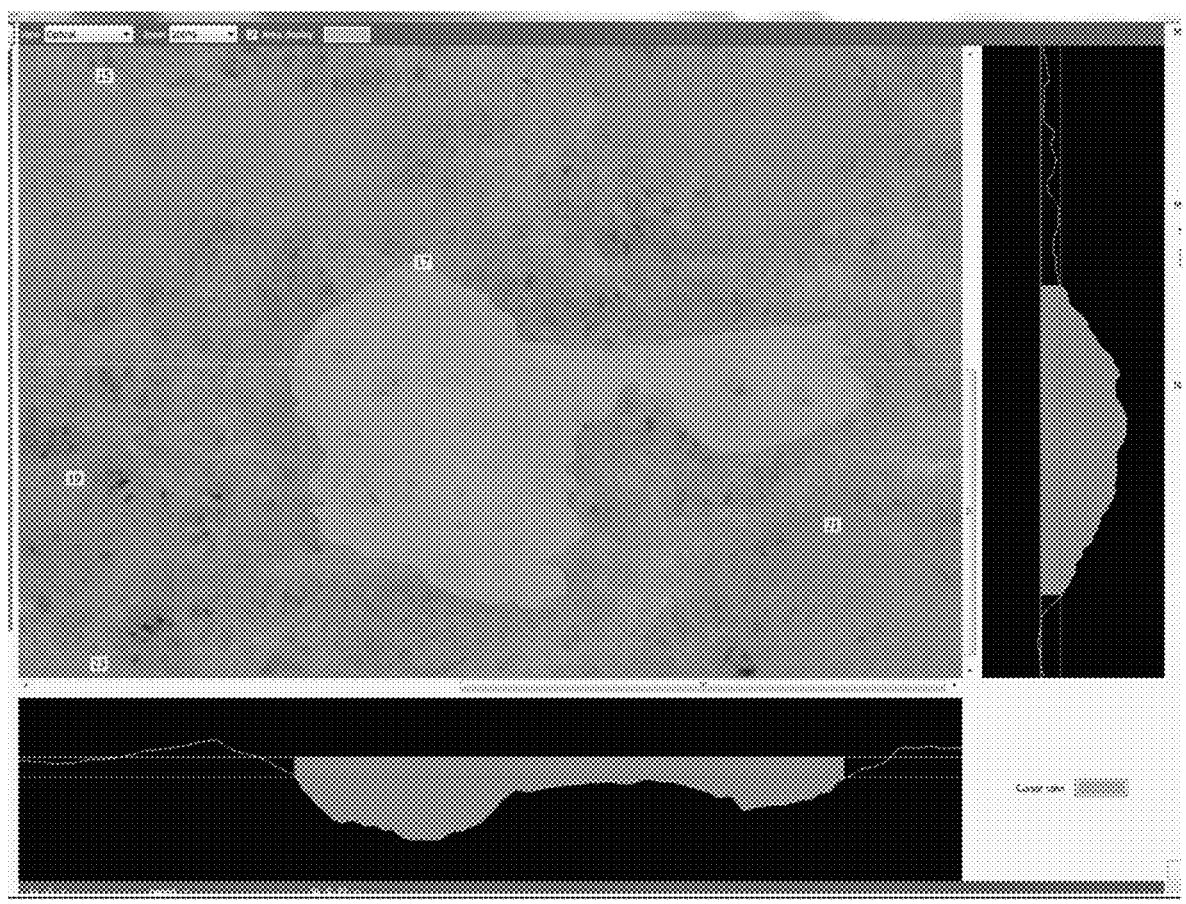
FIG. 4 is a screenshot illustrating a method of determining pocket volume and surface area of a tissue or towel surface using a Keyence VR 3200 Wide Area 3D Measurement Macroscope.

FIG. 3 shows an apparatus for manufacturing a laminate of two plies of a structured paper towel or tissue that are joined to each other, in a face-to-face relationship, in accordance with an exemplary embodiment of the present invention. As shown in the figure, two webs 200, 201 of single ply tissue, which may be manufactured, for example, according to a method described above, are fed to respective pairs of mated pressure rolls 203, 205 and substantially axially parallel embossing rolls 204, 206. A first web 200 is thus fed through a nip 202a formed by pressure roll 203 and embossing roll 204 (also known as a pattern roll) and a second web 201 is likewise fed through a nip 202b between pressure roll 205 and embossing roll 206. The embossing rolls 204, 206, which rotate in the illustrated directions, impress an embossment pattern onto the webs as they pass through nip 202a and 202b. After being embossed, each ply may have a plurality of embossments protruding outwardly from the plane of the ply towards the adjacent ply. The adjacent ply likewise may have opposing protuberances protruding towards the first ply. If a three ply product is produced by adding a third pair of mated pressure and embossing rolls, the central ply may have embossments extending outwardly in both directions.

To perform the embossments at nips 202a and 202b, the embossing rolls 204, 206 have embossing tips or embossing knobs that extend radially outward from the rolls to make the embossments. In the illustrated embodiment, embossing is performed by nested embossing in which the crests of the embossing knobs on one embossing roll intermesh with the embossing knobs on the opposing embossing roll and a nip is formed between the embossing rolls. As the web is fed through nips 202a and 202b, a pattern is produced on the surface of the web by the interconnectivity of the knobs on an embossing roll with the open spaces of the respective pressure roll.

An adhesive applicator roll 212 is positioned upstream of the nip 213 formed between the two embossing rolls and is aligned in an axially parallel arrangement with one of the two embossing rolls to form a nip therewith. The heated adhesive is fed from an adhesive tank 207 via a conduit 210 to applicator roll 212. The applicator roll 212 transfers heated adhesive to an interior side of embossed ply 200 to adhere the at least two plies 200, 201 together, wherein the interior side is the side of ply 200 that comes into a face-to-face relationship with ply 201 for lamination. The adhesive is applied to the ply at the crests of the embossing knobs 205 on embossing roll 204.

Notably, in the present invention, the adhesive is heated and maintained at a desired temperature utilizing, in embodiments, an adhesive tank 207, which is an insulated stainless steel tank that may have heating elements 208 that are substantially uniformly distributed throughout the interior heating surface. In this manner, a large amount of surface area may be heated relatively uniformly. Generally, an adjustable thermostat may be used to control the temperature of the adhesive tank 207. It has been found advantageous to maintain the temperature of the adhesive at between approximately 32 degrees C. (90 degrees F.) to 66 degrees C. (150 degrees F.), and preferably to around 49 degrees C. (120 degrees F.). In addition, in embodiments, the tank has an agitator 209 to ensure proper mixing and heat transfer.

The webs are then fed through the nip 213 where the embossing patterns on each embossing roll 204, 206 mesh with one another.

In nested embossing, the crests of the embossing knobs typically do not touch the perimeter of the opposing roll at the nip formed therebetween. Therefore, after the application of the embossments and the adhesive, a marrying roll 214 is used to apply pressure for lamination. The marrying roll 214 forms a nip with the same embossing roll 204 that forms the nip with the adhesive applicator roll 212, downstream of the nip formed between the two embossing rolls 204, 206. The marrying roll 214 is generally needed because the crests of the nested embossing knobs 205 typically do not touch the perimeter of the opposing roll 206 at the nip 213 formed therebetween.

The specific pattern that is embossed on the absorbent products is significant for achieving the enhanced scrubbing resistance of the present invention. In particular, it has been found that the embossed area on any ply should cover between approximately 5 to 15% of the surface area. Moreover, the size of each embossment should be between approximately 0.04 to 0.08 square centimeters. The depth of the embossment should be within the range of between approximately 0.28 and 0.43 centimeters (0.110 and 0.170 inches) in depth.

The below discussed values for surface profile dimensions (pocket volume and surface area), softness (i.e., hand feel (HF)), ball burst and caliper of the inventive tissue were determined using the following test procedures:

Pocket Volume and Surface Area of a Tissue or Towel Surface

A Keyence VR 3200 Wide Area 3D Measurement Macroscope, available from Keyence Corporation of Osaka, Japan, was used to measure pocket volume and surface area by the following method:

1. Turn on power to computer and monitor.
2. Turn on power on the Control Unit for the VR-3200. If the blue light on the front is on, the system is fully on and ready to run (indicated in yellow). An orange light means the control unit is on but the Head isn't. The switch is located on the back of the control unit (indicated in red).
3. Turn on the power to the VR-3200 Head (pedestal and camera assembly). If a blue light is on, the system is fully functional (indicated in yellow). The switch is located on the front of the unit at the top right (indicated in red).
4. Allow the VR-3200 to reach temperature equilibrium. This can be accomplished by letting it sit idle for 1 hour before use.
5. After VR-3200 is at temperature equilibrium, initialize the software by clicking the "VR3200 G2 Series Software" icon, located on the desktop.
6. Click on the "Viewer" icon. This opens the controls for the camera and measurement system.
7. Place the sample on the viewing platform. The viewing platform rotates to allow for positioning the object of interest. *If you are viewing an item that has significant thickness, lower the stage by adjusting the knob located on the right side of the Head near the bottom. Counterclockwise lowers the stage.*
8. Upon entering the software, the settings will include the use of the lower magnification camera ("Low Mag Cam") set at a magnification of 12×.
9. Utilize the XY Stage adjustment window to identify and center an area with no embossments. The magnification utilized to obtain the measurements and data reported were obtained at 38× magnification. After an area with no embossment is centered in the viewer, the magnification is increased to 38×.

10. To autofocus on one area, double click (with the left mouse button) on that area on the object of interest on the screen image.
11. To scan, click the "Measure" icon located in the bottom right corner of the page.
12. At this point, Lines will appear and move on the object of interest and the screen. This is the measurement in progress. After measurement a 3-D image will appear on the screen.
13. This image can be altered to include the light image and the height measurement image by using the texture slide.
14. Click on the "Analyze" icon located in the bottom right of the screen on this page. Images will appear showing the optical version of the image, the height version of the image (an image using color to show topography), and a 3D image.
15. Go to the "Measurement" tab at the top of the screen and select "Volume & Area Measurement". A new screen will appear containing a large optical image and a topographical scale on the bottom and the right sides of the screen depicting the topography of the cursor lines on the screen (see screen shot shown in FIG. 4).
16. On the right side of the screen, under the "Measure Made" heading, click the "Concave" icon. This feature measures the pockets under the plane set on the screen.
17. The black topographical areas, on the right side and under the image, have 2 lines located in them and act as the upper limit and the lower limit for measurement. These lines are moved manually to establish the area to be measured. The upper limits and lower limits are set so the pocket is completely filled.
18. Using the image on the screen and the numerical read out located on the left of the screen, the upper limit is positioned by maximizing the "Surface Area" in a selected pocket. The borders for the pocket are the raised areas of the tissue or towel created by the TAD fabric. The upper limit is determined when the surface area is at its greatest value without "spilling over" into another pocket.
19. The lower limit is then adjusted the same way. The lower limit is raised until the surface area reaches a maximum value on the screen and in the numerical read out located on the left of the screen, without "spilling over" into another pocket.
20. Using the positions of the upper and lower limits set by the user that maximized the surface area of the pocket, the software provides the values for the volume of the pocket and the average depth of the pocket. Other measurements such as maximum depth are also supplied.
21. Within an area without embossments, steps 17 through 20 are repeated for a number of pockets (e.g., 18 to 20 pockets) so that an average pocket volume and average pocket surface area can be obtained for the area.

Softness Testing

Softness of a 2-ply tissue web was determined using a Tissue Softness Analyzer (TSA), available from EMTECH Electronic GmbH of Leipzig, Germany. A punch was used to cut out three 100 cm² round samples from the web. One of the samples was loaded into the TSA, clamped into place, and the TPII algorithm was selected from the list of available softness testing algorithms displayed by the TSA. After inputting parameters for the sample, the TSA measurement program was run. The test process was repeated for the remaining samples and the results for all the samples were averaged.

Ball Burst Testing

Ball Burst of a 2-ply tissue web was determined using a Tissue Softness Analyzer (TSA), available from EMTECH Electronic GmbH of Leipzig, Germany using a ball burst head and holder. A punch was used to cut out five 100 cm² round samples from the web. One of the samples was loaded into the TSA, with the embossed surface facing down, over the holder and held into place using the ring. The ball burst algorithm was selected from the list of available softness testing algorithms displayed by the TSA. The ball burst head was then pushed by the EMTECH through the sample until the web ruptured and the grams force required for the rupture to occur was calculated. The test process was repeated for the remaining samples and the results for all the samples were averaged.

Stretch & MD, CD, and Wet CD Tensile Strength Testing

An Instron 3343 tensile tester, manufactured by Instron of Norwood, Mass., with a 100N load cell and 25.4 mm rubber coated jaw faces was used for tensile strength measurement. Prior to measurement, the Instron 3343 tensile tester was calibrated. After calibration, 8 strips of 2-ply product, each one inch by four inches, were provided as samples for each test. For testing MD tensile strength, the strips are cut in the MD direction and for testing CD tensile strength the strips are cute in the CD direction. One of the sample strips was placed in between the upper jaw faces and clamp, and then between the lower jaw faces and clamp with a gap of 2 inches between the clamps. A test was run on the sample strip to obtain tensile and stretch. The test procedure was repeated until all the samples were tested. The values obtained for the eight sample strips were averaged to determine the tensile strength of the tissue. When testing CD wet tensile, the strips are placed in an oven at 105 deg Celsius for 5 minutes and saturated with 75 microliters of deionized water immediately prior to pulling the sample.

Basis Weight

Using a dye and press, six 76.2 mm by 76.2 mm square samples were cut from a 2-ply product being careful to avoid any web perforations. The samples were placed in an oven at 105 deg C for 5 minutes before being weighed on an analytical balance to the fourth decimal point. The weight of the sample in grams is divided by $(0.0762 \text{ m})^2$ to determine the basis weight in grams/m².

Caliper Testing

A Thwing-Albert ProGage 100 Thickness Tester, manufactured by Thwing Albert of West Berlin, N.J., USA, was used for the caliper test. Eight 100 mm×100 mm square samples were cut from a 2-ply product. The samples were then tested individually and the results were averaged to obtain a caliper result for the base sheet.

EXAMPLES

Example #1

Paper Towel Made on a Wet-Laid Asset with a Three Layer Headbox was produced using the through air dried method. At 5% speed differential the web was transferred from the inner wire to the TAD fabric. A TAD fabric design named Prolux 593 supplied by Albany (216 Airport Drive Rochester, N.H. 03867 USA Tel: +1.603.330.5850) was utilized. The fabric had a 40 yarns/inch Mesh and 34 yarns/inch Count, a 0.40 mm warp monofilament, a 0.50 mm weft monofilament, a 1.89 mm caliper, with a 670 cfm and a knuckle surface that is sanded to impart 15% contact area with the Yankee dryer. The flow to each layer of the headbox was about 33% of the total sheet. The three layers of the finished tissue from top to bottom were labeled as air, core and dry. The air layer is the outer layer that is placed on the TAD fabric, the dry layer is the outer layer that is closest to the surface of the Yankee dryer and the core is the center section of the tissue. The tissue was produced with 20% *Eucalyptus*, 15% *Cannabis* bast fiber, and 65% northern bleached softwood kraft (NBSK) fibers. The Yankee layer fiber was 50% *Eucalyptus*, 50% NBSK. Polyamine polyamide-epichlorohydrin resin at 10 kg/ton (dry basis) and 4 kg/ton (dry basis) of carboxymethyl cellulose was added to each of the three layers to generate permanent wet strength.

The towel was then plied together using a nested embossing process in which a heated adhesive is applied with an applicator roll to an embossing roll to create a rolled 2-ply product with 142 sheets, a roll diameter of 142 mm, with sheets a length of 6.0 inches and width of 11 inches. The 2-ply tissue product further had the following product attributes: Basis Weight 39 g/m$^2$, Caliper 0.850 mm, MD tensile of 385 N/m, CD tensile of 365 N/m, a ball burst of 820 grams force, an MD stretch of 18%, a CD stretch of 6%, a CD wet tensile of 105 N/m, an absorbency of 750 gsm and a Wet Scrubbing resistance of 130 revolutions and a 53 TSA softness.

Table 1 shows a comparison of average pocket volumes of the 2-ply paper towel product of Example 1 versus competitor products.

TABLE 1

|  | Example 1 | Brawny | Irving | Bounty | Clearwater |
| --- | --- | --- | --- | --- | --- |
| Date and location of purchase | N/A | Ingles, Anderson SC July 2015 | Target, Anderson SC July 2015 | Target, Anderson SC July 2015 | Rite Aid, Anderson SC July 2015 |
| Volume (mm^3) | 0.463 | 0.123 | 0.374 | 0.589 | 0.272 |
| Area at Surface (mm^2) | 2.548 | 1.044 | 2.288 | 2.447 | 1.918 |
| Basis Weight (gsm) | 39.0 | 47.2 | 44.3 | 48.2 | 44.7 |

As shown in Table 1, the inventive 2-ply paper towel product provides an outer surface with higher pocket volume as compared to competitor products except for the Bounty product. The higher pocket volume in turn provides higher Z-direction thickness and unique surface topography, both of which contribute to an overall higher softness of the paper towel product. Also, as shown in Table 1, the inventive paper towel product exhibits an outer surface with higher pocket surface area compared to competitor products.

Now that embodiments of the present invention have been shown and described in detail, various modifications and improvements thereon will become readily apparent to those skilled in the art. Accordingly, the spirit and scope of the present invention is to be construed broadly and not limited by the foregoing specification.

What is claimed is:

1. A disposable tissue or paper towel product comprising: at least two plies, an exposed outer surface of at least one of the two plies having a surface area comprising a plurality of pockets, the plurality of pockets having an average volume greater than 0.4 mm$^3$ and an average surface area of 2.5 mm$^2$, the disposable tissue or paper towel product having a calculated caliper of 0.668 mm or less that springs back to 0.850 mm when removed from a roll on which the disposable tissue or paper towel is wound, wherein at least one of the two plies comprises embossments and the embossments provide an embossed area covering between 5 to 15 percent of the surface area.

2. The product of claim 1, wherein the product is formed using a structured fabric of a through air drying process.

3. The product of claim 1, wherein the product is formed using one of the following types of wet-laid forming processes: Through Air Drying (TAD), Uncreped Through Air Drying (UCTAD), Advanced Tissue Molding System (ATMOS), NTT, and ETAD.

4. The product of claim 1, wherein the at least two plies are laminated together.

5. The product of claim 4, wherein the at least two plies are laminated together with heated adhesive.

6. The product of claim 2, wherein the structured fabric is made of warp and weft monofilament yarns.

7. The product of claim 6, wherein the diameter of the warp monofilament yarn is 0.40 mm.

8. The product of claim 6, wherein the diameter of the weft monofilament yarn is 0.550 mm.

9. The product of claim 6, wherein the diameter of the warp monofilament yarn is 0.30 mm to 0.55 mm.

10. The product of claim 6, wherein the diameter of the weft monofilament yarn is 0.30 to 0.55 mm.

11. The product of claim 2, wherein the through air drying process comprises transferring a web that forms the at least one of the two plies from a forming wire to the structured fabric at a 5% speed differential or more.

12. A disposable tissue or paper towel product comprising:
at least two plies, an exposed outer surface of at least one of the two plies having a surface area comprising a plurality of pockets, the plurality of pockets having an average volume greater than 0.4 mm$^3$ and an average surface area of 2.5 mm$^2$, the disposable tissue or paper towel product having a basis weight less than 45 gsm, the disposable tissue or paper towel product having a calculated caliper of 0.668 mm or less that springs back to 0.850 mm when removed from a roll on which the disposable tissue or paper towel is wound, wherein at least one of the two plies comprises embossments and the embossments provide an embossed area covering between 5 to 15 percent of the surface area.

13. The product of claim 12, wherein the product is formed using a structured fabric of a through air dying process.

14. The product of claim 12, wherein the product is formed using one of the following types of wet-laid forming processes: Through Air Drying (TAD), Uncreped Through Air Drying (UCTAD), Advanced Tissue Molding System (ATMOS), NTT, and ETAD.

15. The product of claim 12, wherein the at least two plies are laminated together.

16. The product of claim 15, wherein the at least two plies are laminated together with heated adhesive.

17. The product of claim 13, wherein the structured fabric is made of warp and weft monofilament yarns.

18. The product of claim 17, wherein the diameter of the warp monofilament yarn is 0.40 mm.

19. The product of claim 17, wherein the diameter of the weft monofilament yarn is 0.550 mm.

20. The product of claim 17, wherein the diameter of the warp monofilament yarn is 0.30 mm to 0.55 mm.

21. The product of claim 17, wherein the diameter of the weft monofilament yarn is 0.30 to 0.55 mm.

22. The product of claim 13, wherein the through air drying process comprises transferring a web that forms the at least one of the two plies from a forming wire to the structured fabric at a 5% speed differential or more.

23. A disposable tissue or paper towel product comprising:
at least two plies, an exposed outer surface of at least one of the two plies having a surface area comprising a plurality of pockets, the plurality of pockets having an average volume greater than 0.4 mm$^3$, the disposable tissue or paper towel product having a basis weight less than 45 gsm, the disposable tissue or paper towel product having a calculated caliper of 0.668 mm or less that springs back to 0.850 mm when removed from a roll on which the disposable tissue or paper towel is wound, wherein at least one of the two plies comprises embossments and the embossments provide an embossed area covering between 5 to 15 percent of the surface area.

24. The product of claim 23, wherein the product is formed using a structured fabric of a through air dying process.

25. The product of claim 23, wherein the product is formed using one of the following types of wet-laid forming processes: Through Air Drying (TAD), Uncreped Through Air Drying (UCTAD), Advanced Tissue Molding System (ATMOS), NTT, and ETAD.

26. The product of claim 23, wherein the at least two plies are laminated together.

27. The product of claim 26, wherein the at least two plies are laminated together with heated adhesive.

* * * * *